(12) United States Patent
Weiberle et al.

(10) Patent No.: US 8,899,696 B2
(45) Date of Patent: Dec. 2, 2014

(54) BRAKE BOOSTER, AND METHOD AND DEVICE FOR THE OPERATION THEREOF

(75) Inventors: Reinhard Weiberle, Vaihingen/Enz (DE); Timo Jahnz, Besigheim (DE); Jochen Mayer, Giengen an der Brenz (DE); Jens Kolarsky, Bietigheim/Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 183 days.

(21) Appl. No.: 13/579,171

(22) PCT Filed: Dec. 15, 2010

(86) PCT No.: PCT/EP2010/069743
§ 371 (c)(1),
(2), (4) Date: Nov. 12, 2012

(87) PCT Pub. No.: WO2011/098178
PCT Pub. Date: Aug. 18, 2011

(65) Prior Publication Data
US 2013/0047593 A1   Feb. 28, 2013

(30) Foreign Application Priority Data

Feb. 15, 2010 (DE) .................. 10 2010 001 939

(51) Int. Cl.
*B60T 8/44* (2006.01)
*B60T 1/10* (2006.01)
*B60T 8/40* (2006.01)
*B60T 7/04* (2006.01)
*B60T 13/74* (2006.01)

(52) U.S. Cl.
CPC . *B60T 7/042* (2013.01); *B60T 1/10* (2013.01); *B60T 8/4077* (2013.01); *B60T 13/745* (2013.01)
USPC ......... 303/114.1; 303/3; 303/113.4; 60/547.1

(58) Field of Classification Search
USPC .................. 303/114.1, 3, 15, 20, 113.4, 155, 303/DIG. 3, DIG. 4; 188/358, 359; 60/545, 60/547.1, 591; 91/376 R, 369.1
See application file for complete search history.

(56) References Cited

U.S. PATENT DOCUMENTS 4,404,803 A * 9/1983 Steffes ..................... 60/547.1
5,813,230 A * 9/1998 Hartl et al. ................. 60/591
(Continued)

FOREIGN PATENT DOCUMENTS

| DE | 195 15 848 A1 | 10/1996 |
| DE | 198 17 589 A1 | 10/1998 |
| DE | 199 50 029 A1 | 4/2001 |
| DE | 103 19 663 A1 | 11/2004 |

(Continued)

OTHER PUBLICATIONS

International Search Report corresponding to PCT Application No. PCT/EP2010/069743, mailed Apr. 21, 2011 (German and English language document) (7 pages).

*Primary Examiner* — Pamela Rodriguez
(74) *Attorney, Agent, or Firm* — Maginot, Moore & Beck LLP (57) ABSTRACT

A controllable brake booster and a method and a device for controlling the brake booster are disclosed. The pedal force that a driver must apply in order to convey an input element of the brake booster into an actuating position or to retain the element in an actuating position is adjusted by operating the brake booster.

16 Claims, 3 Drawing Sheets

(56) References Cited

U.S. PATENT DOCUMENTS

| | | |
|---|---|---|
| 6,007,160 A | 12/1999 | Lubbers et al. |
| 2005/0017574 A1 | 1/2005 | Weiberle et al. |
| 2009/0045672 A1 | 2/2009 | Nishino et al. |
| 2009/0115242 A1 | 5/2009 | Ohtani et al. |
| 2009/0261649 A1 | 10/2009 | Higuma et al. |
| 2010/0089054 A1* | 4/2010 | Leiber .................. 60/547.1 |
| 2011/0178687 A1 | 7/2011 | Anderson et al. |
| 2012/0222745 A1* | 9/2012 | Kolarsky ..................... 137/1 |

FOREIGN PATENT DOCUMENTS

| | | |
|---|---|---|
| DE | 10 2007 016 136 A1 | 10/2008 |
| DE | 10 2007 030 441 A1 | 1/2009 |
| DE | 10 2007 032 501 A1 | 1/2009 |
| EP | 1 808 347 A1 | 7/2007 |
| JP | 59-149856 A | 8/1984 |
| JP | 2002-321611 A | 11/2002 |
| JP | 2009-248673 A | 10/2009 |
| WO | 2010/006996 A1 | 1/2010 |

* cited by examiner

BRAKE BOOSTER, AND METHOD AND DEVICE FOR THE OPERATION THEREOF

This application is a 35 U.S.C. §371 National Stage Application of PCT/EP/2010/069743, filed on Dec. 15, 2010, which claims the benefit of priority to Serial No. DE 10 2010 001 939.9, filed on Feb. 15, 2010 in Germany, the disclosures of which are incorporated herein by reference in there entirety.

BACKGROUND

In a hydraulic brake system of a motor vehicle, usually a brake pedal is activated by the driver and mechanically—where applicable with the support of a brake booster—displaces a piston in a master brake cylinder, to the outputs of which is connected a hydraulic assembly. Brake fluid is thus introduced into the hydraulic assembly (e.g. ESP or ABS) and passed to the wheel brake cylinders. There the volume introduced increases the brake pressure and by contact of the brake pads on the brake disks, leads to a braking effect. Various designs of brake boosters are known, for example pneumatic, hydraulic or electromechanical brake boosters.

An electromechanical brake booster is known for example from DE 102007016136 A1. There, from a calculated pedal force applied by a driver, the associated additional braking force to set a defined braking force amplification is calculated.

DE 199 50 029 A1 describes a method and a device for braking force amplification in a vehicle. The amplification factor is changed, preferably reduced, in at least one operating situation, preferably on stoppage of the vehicle, in comparison with the amplification factor outside this situation.

Pedal travel simulators are known for example from the publication "Automotive Handbook" (25$^{th}$ edition, BOSCH, Vieweg Verlag ISBN 3528238763). In an electro-hydraulic brake, they are part of an actuation unit and allow a suitable force-travel curve and an appropriate damping of the brake pedal. Thus on braking with an electro-hydraulic brake, the driver experiences the same braking feel as in a very well-designed conventional brake system.

SUMMARY

The present disclosure concerns a controllable brake booster and a method for operation and a device for controlling the controllable brake booster.

According to the method of the disclosure, the controllable brake booster is part of a brake system of a motor vehicle and has an input element to activate the brake system. The controllable brake booster is operated such that a pedal force which acts on the input element is set by the operation of the controllable brake booster. Advantageously it is thus possible to set the pedal force, i.e. a force which the driver must apply to retain the pedal at an actuating position. On activating the brake pedal, a driver always expects a pedal force corresponding to the actuating position, known as a pedal characteristic. With the method according to the disclosure, advantageously the pedal characteristic can be set by means of the controllable brake booster. The term "controllable" in this context can mean either open-loop or closed-loop control. In the present disclosure either open-loop control of the brake booster or closed-loop control based on parameters relevant for control is conceivable.

In an advantageous refinement the controllable brake booster has a booster body and an output element. Via the output element a master cylinder is subjected to a force. The master cylinder is a force-pressure conversion element as used in many hydraulic brake systems, for example in the form of a master brake cylinder, or a tandem master brake cylinder. The controllable brake booster in the method according to the disclosure has a first elastic element and a second elastic element. The first elastic element is arranged between the input element and the booster body. The second elastic element is arranged between the output element and the master cylinder. In the method according to the disclosure the respective effects of the first and/or second elastic element in relation to pedal force are taken into account as the pedal force depends on the effect of the first and/or second elastic element. The first and/or second elastic element must be taken into account in relation to the pedal force as they make a contribution to the pedal force. If, on activation of the brake system via the input element, the first and/or second elastic element is deformed or compressed, this leads to a feedback force opposite the deformation or compression direction of the elastic element. The pedal force is then set using at least one piece of information in relation to the first and/or second effect. This information is understood to mean one or more parameter(s) which represent the present effect of the first and/or second elastic element. The information can be determined from sensors or operating parameters of the brake booster and/or the hydraulic brake system. As a non-restrictive example, this could for example be the spring compression and spring constant. From these a force can be determined which is the present effect of the elastic element i.e. the spring.

This information relating to the first and/or second effect can then be used to set the pedal force by actuation of the brake booster. The information can be processed further by means of a control unit for further use in the method according to the disclosure.

Furthermore it is proposed that in the method according to the disclosure the brake booster has an idle travel between the input element and the output element, wherein this idle travel depends on an operating mode of the brake booster. The respective operating mode of the brake booster can depend on whether the idle travel is present or overcome. If the idle travel is present, the brake booster is operated according to its original curve. In this case the pedal force depends solely on the effect of the first elastic element. In particular the pedal force is connected with a force F_spring1 according to the correlation given in the claim. In this way, with suitable dimensioning of the elastic element/spring which generates the only feedback effect i.e. the pedal force when idle travel is present, a behavior can be simulated which the driver recognizes for example from a pneumatic brake booster from the prior art. If an idle travel is present, the driver also feels only spring forces. This operating mode and the pedal characteristic in this operating mode play an important role for the total pedal characteristic of the brake pedal, which consists for example of a first operating mode in which the idle travel is still present and a second operating mode which can follow the first operating mode and in which the idle travel is overcome.

In a further embodiment of the method according to the disclosure it is proposed that the brake booster is in an operating mode in which the idle travel between the input element and output element is overcome. It is also proposed that the brake booster can apply a supporting force which acts on an output element. In this operating mode the brake booster is operated such that the pedal force is set by adjusting the supporting force.

In a further embodiment of the method according to the disclosure it is proposed that the supporting force of the brake booster is set such that the pedal force assumes a pre-specified value. Thus by means of the brake booster, a pre-specified value for the pedal force can be set which for example can be stored in a control unit.

Furthermore it is proposed that the pre-specified value for the pedal force depends on a displacement travel of the input element. Such a displacement travel of the input element can be set via an actuating position of the brake pedal specified by the driver. In this way the pre-specified value for the pedal force depends firmly on an actuating position and thus leads to a pedal characteristic. Pedal force and displacement travel can correlate or be specified and/or stored in particular in the form of a curve. In this way the pedal characteristic can be specified by pre-specifying a curve. A variable or specifiable pedal characteristic has the advantage that for example an automatic or driver-specified selection is possible of a curve adapted to the current driving situation such as for example when descending a hill, on a twisty road or for a sporting driving style.

Furthermore it is proposed to operate the controllable brake booster in a hydraulic partial brake system. The hydraulic partial brake system is part of a total brake system which as well as the hydraulic partial brake system has an additional partial brake system. It is proposed here that by adjusting the supporting force of the brake booster, a change in pedal force is countered. The change in pedal force is here provoked by adapting a braking effect of the hydraulic partial brake system to a change in braking effect of the additional partial brake system. This has the advantage that the pedal force is not changed perceptibly, in the ideal case not at all, if the braking effect of the additional partial brake system changes and therefore the braking effect of the hydraulic partial brake system is adapted, which in the normal case leads to a modified pedal force. The subject of this claim in particular allows operation of a brake system consisting of a hydraulic and a regenerative brake system which are operated together. As regenerative brake systems, in particular the braking effect of regenerative brake systems, can depend greatly on the speed of the vehicle, on braking the braking effect of the regenerative brake system changes. This change in braking effect can be countered, in particular compensated, by adaptation of the hydraulic braking effect. With the method according to the disclosure this compensation can be performed without the driver noticing.

In particular it is proposed that the braking effect is adapted such that a total braking effect of the hydraulic partial brake system (13) and the additional partial brake system is held constant. In this way the driver does not notice a shift of the relative proportions of the individual partial brake systems in the total braking effect of the total brake system.

In particular it is proposed that the braking effect of the hydraulic partial brake system (13) is adapted by setting the braking effect independently of the driver's force, in particular by means of an adaptation device (19). In this way the driver thus need not himself guarantee the adaptation of the hydraulic braking by adapting the driver's force, but adaptation takes place by means of an adaptation device which can be integrated into or connected to the hydraulic partial brake system.

Advantageously the pre-specified value for the pedal force is set in the method according to the disclosure using at least one piece of information in relation to the following parameters: the effect of the first elastic element, the effect of the second elastic element, a force F_hyd and the supporting force. The pedal force depends on these parameters according to the correlation given. In this way all effects i.e. all forces which contribute to the pedal force are taken into account, wherein it is noted that the resulting pedal force can be set by adjusting the supporting force. In particular if an operating situation occurs in which the forces of the first and second elastic element are pre-specified by input from the driver via the input element and the hydraulic force F_hyd is pre-specified by the adaptation device.

In an advantageous refinement of the method according to the disclosure, with only the braking effect of the additional brake system, by adjusting the supporting force each pedal force can be set less than or equal to a limit value of the pedal force, wherein the limit value arises according to the correlation given from the effect of the first elastic element and the effect of the second elastic element. In this way the limit value can be adjusted by dimensioning the elastic elements, in particular the springs.

The present disclosure comprises furthermore a device for controlling a controllable brake booster. In an advantageous embodiment control takes place such that by means of the brake booster a pedal force which acts on the input element is set.

Furthermore the device for controlling the controllable brake booster can be controlled such that the setting of the pedal force takes place using the effect of the first and/or second elastic element, wherein the pedal force depends on an effect of the first and/or second elastic element. Thus irrespective of the actuating position of the input element, always the correct, i.e. the currently present, effect of the first and/or second elastic element can be taken into account to control the brake booster.

Further embodiments of the device according to the disclosure for controlling the brake booster are described below.

A further subject of the present disclosure is a controllable brake booster with a device as claimed in any of the claims in relation to the device for controlling the brake booster, wherein the brake booster is part of a brake system of a motor vehicle. The brake booster here has an input element to activate the brake system and is able to apply a supporting force which acts on an output element of the brake booster.

DETAILED DESCRIPTION

Figure 1:
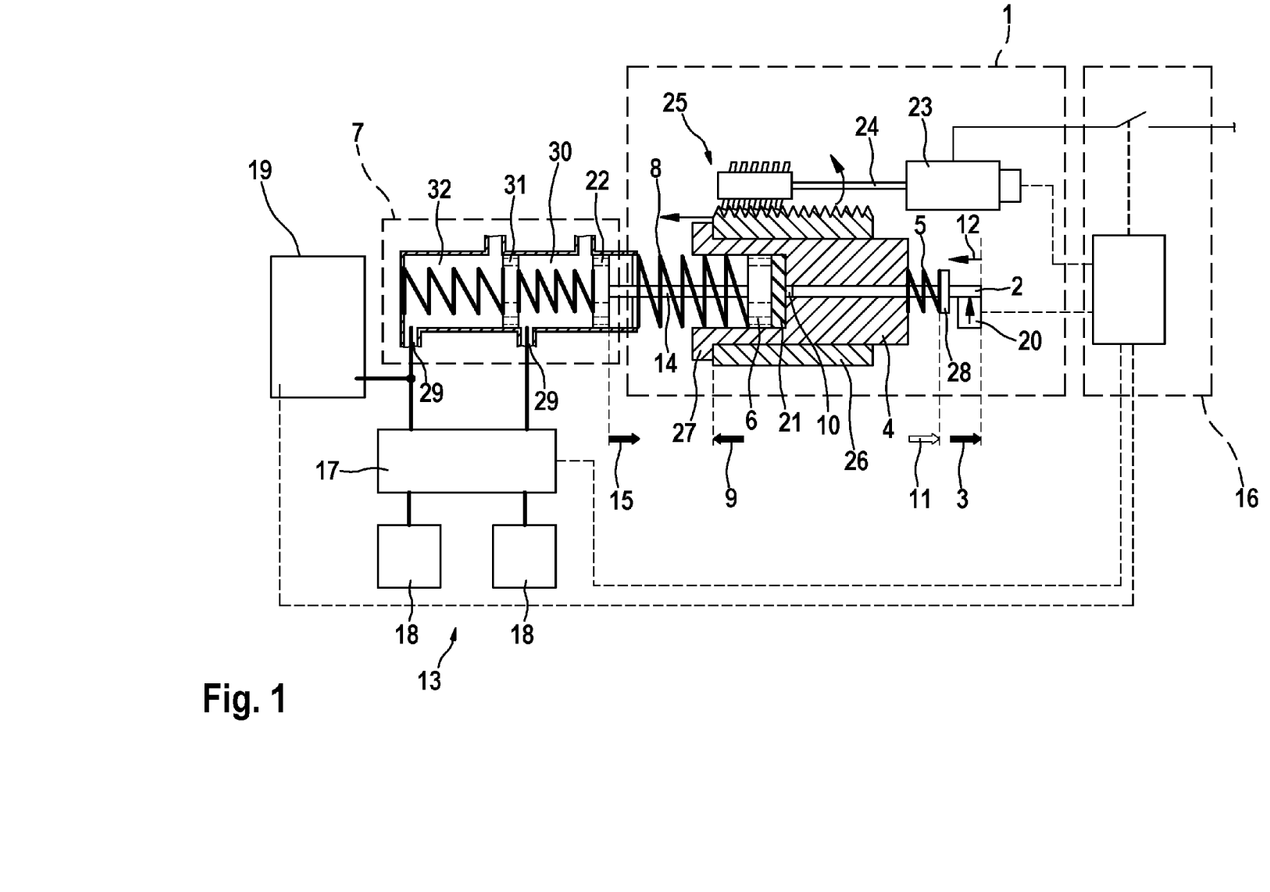
FIG. 1 shows diagrammatically a hydraulic brake system in which the method according to the disclosure for operating a brake booster is used. In the actuating position shown here there is still an idle travel between the input element and the reaction plate.

The method according to the disclosure is explained with reference to a brake system. This brake system consists of at least two partial brake systems which independently of each other can apply a braking effect to brake a vehicle. One of these partial brake systems can be a hydraulic partial brake system 13. The hydraulic partial brake system 13 as shown in FIG. 1 can comprise amongst others the following components: a brake booster 1, a control unit for the hydraulic brake system 16, a master brake cylinder 7 shown as a tandem master brake cylinder 7, a brake control system for example an ESP or ABS hydraulic assembly 17, and at least one wheel brake including supply line 18. Furthermore the hydraulic partial brake system can have an adaptation unit 19 which is able, independently of the driver, to take and/or add volumes of brake fluid from and/or to the brake system. In this way the brake pressure in the hydraulic brake system can be adapted by the adaptation unit 19.

The parts of the hydraulic partial brake system mentioned above are described in more detail below.

Figure 2:
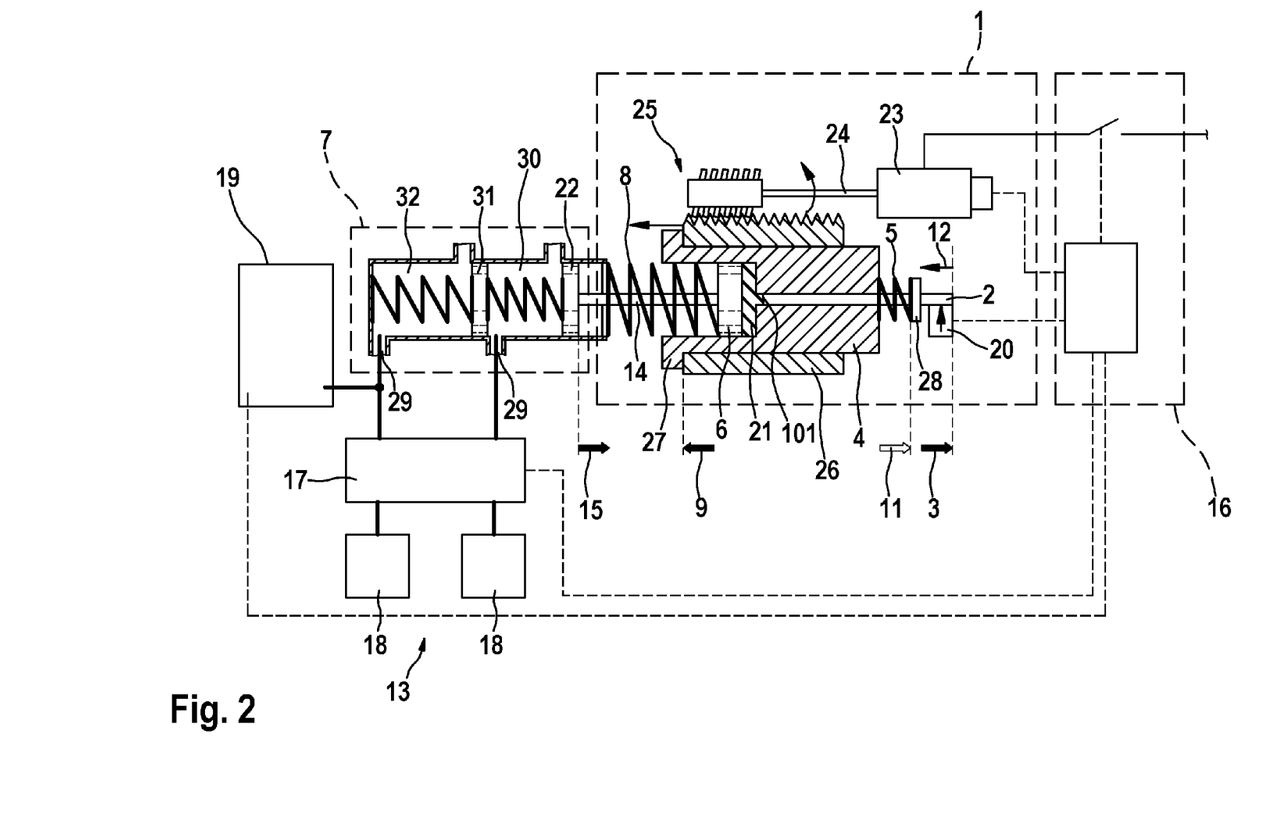
FIG. 2 shows diagrammatically the brake system shown in FIG. 1, wherein here the idle travel between the input element and the reaction plate has already been overcome.

The brake booster 1 is shown in FIG. 1 as an electromechanical brake booster. The disclosure is not however restricted to this method of amplification. The use of a vacuum brake booster or a hydraulic brake booster is also possible. The electromechanical brake booster 1 comprises an input element 2 to receive a driver's brake request. The input element 2 can for example be coupled to a brake pedal (not shown) or a brake lever, via which the vehicle leader applies a braking force. A sensor device 20 is provided to determine a displacement travel 12 of the input element. When the driver moves the input element in the actuation direction (to the left in FIG. 1), via a reaction plate 21 he can apply force to an output element 14, 6 and hence apply a force to an input piston 22 of the tandem master brake cylinder. The output element 6, 14 can for this purpose for example have a piston rod 14 which is coupled to the input piston 22 of the tandem master brake cylinder 7. The reaction plate 21 is in contact or also in fixed connection with a guide part 6 of the output element 6, 14. Between the reaction plate 21 and the input element 2 can be provided an idle travel 10 which must be overcome on force transfer from the driver via the input element 2 to the output element 6, 14. An actuating state in which the idle travel 10 is overcome is shown in FIG. 2, 101. Here identical elements have not been renumbered.

In addition to the driver's force, the output element 6, 14 can be subjected to a supporting force F_sup 9 of the electromechanical brake booster 1. For this a rotation movement of an electric motor is converted via a rod 24 and a rotation-translation conversion gear 25 into a translational movement of a booster housing 26. The design of this electromechanical brake booster should here be regarded merely as an example, other drive methods are possible such as for example belt gears, worm gears, spindle drives, wherein this list is not conclusive. When the electric motor 23 is driven, the booster housing 26 moves in the actuation direction of the tandem master brake cylinder 7; this direction coincides with the actuation direction of the input element 2. The booster housing 26 comprises a booster body 4 which via a stop 27 transmits the translation movement of the booster housing 26 to the booster body 4. The booster body can also be connected fixedly, where applicable releasably, to the booster body. The booster body 4 has in the axial direction two central openings which surround firstly the input element 2 and secondly the guide part 6 of the output element 6, 14. Input element 2 and guide part 6 can for example be mounted sliding. The reaction plate is in an outer region and hence in the axial direction between the guide part 6 and booster body 4. When the reaction plate 21 in this outer region comes to rest on the booster body 4 or is in permanent contact therewith, the supporting force F_support which is applied by the electromechanical brake booster 1 can be transmitted via the reaction plate 21, in particular via its outer region, to the output element 6, 14. Via an inner region of the reaction plate, the driver's force can be transmitted to the output element 6, 14. For this the idle travel 10 must be overcome, as stated.

The input element 2 has a molding 28 on which rests an elastic element 5. The molding can for example take the form of an annular molding. It is however also conceivable that a support point/support surface is applied as an additional component on the input element. The elastic element can be provided for example in the form of a spring. A pretensioning of the spring is also possible. The other side of the elastic element 5 facing away from the molding 28, in particular the spring 5, rests on the booster body 4. When the spring 5 is compressed by displacing the input element 2 in the direction of the booster body, this leads to a return force 11 which is directed against the displacement.

Between the guide part 6 and the tandem master cylinder 7 is mounted a second elastic element 8 which rests on one side on the tandem master cylinder and on the other side on the guide part 6. During a displacement of the output element 6, 14 in the direction of the tandem master cylinder, the second elastic element is compressed which also leads to a return force which is directed against the displacement. The second elastic element can also be a spring, where applicable with a pretension.

A linear spring curve is not absolutely necessary in the two springs. Both the first spring 5 and the second spring 8 can have a non-linear spring curve.

The springs need not necessarily be mounted directly at said contact points as shown in FIG. 1; mounting at a fixed distance at points moving with the booster body 4 or output element 6, 14 is also possible. Also, instead of contact, a fixing of the springs with suitable fixing means is possible. It is also possible that the springs 5, 8 are fixed on one side but loose on the other side and make contact only at specific relative distances of the contact points.

For open-loop or closed-loop control of the brake booster, a control unit 16 is provided which controls the electromechanical brake booster using for example signals from sensor device 20 and signals from motor 23. The use of further sensors is evidently possible, for example a differential travel sensor to determine the relative deflection between the input element 2 and booster body 4, or a force sensor to determine the driver's force. By controlling the brake booster it is possible to adjust the supporting force. Thus the brake booster can be regarded as a booster with variable amplification i.e. a variable ratio of driver's force to supporting force. Also the amplification can for example be adapted actively to the driving situation or be stored in the control unit of the brake booster in the form of a curve as a function of further parameters. In particular such further parameters can be the displacement travel 12 or the braking effect of a further brake system, for example a regenerative partial brake system, of the vehicle.

The control unit 16 of the brake booster need not be provided separately in the vehicle, it can equally well be part of a control unit for the entire brake system or for the entire vehicle.

The master brake cylinder 7 serves to receive the actuating force applied by the brake booster 1 and/or by the driver. The depiction as a tandem master brake cylinder (with two pistons and two chambers) is one of several possibilities for designing the master brake cylinder. The master brake cylinder in the case shown has two connections to a reservoir for hydraulic fluid (not drawn) and two outlets for hydraulic fluid 29 which lead to connected brake circuits. The actuating force applied by the brake booster and the driver moves the first piston 22 of the master brake cylinder in the actuation direction (to the left in FIG. 1) which leads to the hydraulic fluid being displaced from the first chamber through the first outlet in the direction of the connected brake circuit. Such actuation is accompanied by a displacement of the second piston 31, whereby also hydraulic fluid is displaced from the second chamber 32 in the direction of the second brake circuit. The introduction of hydraulic fluid into the brake circuit leads to a pressure rise at the wheel brakes 18 which are connected to the brake circuits and hence to a braking effect. The wheel brakes 18 are here shown schematically as p-V elements, in which a volume increase V leads to a resulting pressure p. These elements include not only the wheel brake in itself but also the supply lines to the wheel brakes. Each of the elements 18 shown here can comprise several wheel brakes, thus for example all wheel brakes of an axle of the vehicle.

Between the wheel brakes 18 and the tandem master cylinder 7 can be provided a brake pressure control system and/or a brake slip control system such as an ESP/ABS hydraulic assembly 17 which will not be described in more detail here.

Furthermore the hydraulic partial brake system can comprise an adaptation unit 19 which is able, independently of the driver, to take and/or add brake fluid volume from and/or to the brake system. In this way the brake pressure in the hydraulic brake system can be adapted by the adaptation unit 19. Such an adaptation unit can for example be a piston-cylinder arrangement with an actuator or a hydraulic accumulator to/from which the volume of hydraulic fluid can be received/ emitted.

A pressure which predominates in the chambers of the master brake cylinder after actuation of the master brake cylinder leads to a reaction force F_hyd of the brake system which is directed against the original actuation direction. The reaction force F_hyd acts at least proportionally back on the input element 2.

With regard to the forces described above which act on the input element 2 and hence on the driver, the following forces can be identified: a driver's input force, a supporting force F_sup 9 of the brake booster, the return force of the first spring F_spring1 11, the return force of the second spring F_spring2 15 and the reaction force of the hydraulic brake system F_hyd 15.

These forces can be combined into a force F_ped 3 which acts as a total feedback effect on the input element.
F_ped=F_spring1+F_spring2+F_hyd−F_support For a fixed actuating position of input element 2 i.e. a fixed displacement travel 12, with the regulated or set supporting force F_sup, a defined feedback force F_ped thus exists. The driver expects this force when he moves the input element to this actuating position. The correlation between F_ped and the displacement travel 12 corresponds to the driver's pedal feel, his familiar brake pedal characteristic. The driver also expects a braking effect corresponding to the actuating position.

If braking is performed purely hydraulically, the brake booster is operated according to its usual curve which specifies the correlation of displacement travel 12 and supporting force F_sup.

If the total brake system comprises as well as the hydraulic partial brake system a further, for example regenerative brake system, in the case of a combined braking with both partial brake systems a braking effect results a total braking moment. If the braking effect of the regenerative brake system changes, the braking effect of the hydraulic partial brake system must be adapted to the braking effect of the regenerative brake system so that the total braking moment remains constant.

To guarantee this, in the method according to the disclosure the braking effect of the hydraulic brake system is adapted to the regenerative braking moment by operating the adaptation unit, in that via the adaptation unit 19, volumes of hydraulic fluid are taken from and/or added to the brake system. The adaptation of the braking effect here takes place independently of the driver, in particular independently of the driver's force. The adaptation unit 19 is operated by a control unit.

Due to this adaptation however the pressure in the brake system changes. Such a pressure change leads to a modified reaction force F_hyd and as shown above therefore to a modified feedback effect F_ped.

The driver who expects a feedback effect F_ped corresponding to the displacement travel and the driver's force may notice this change and find it irritating. For this reason in the method according to the disclosure, the force F_ped is set by adjusting the supporting force F_sup.

Figure 3:
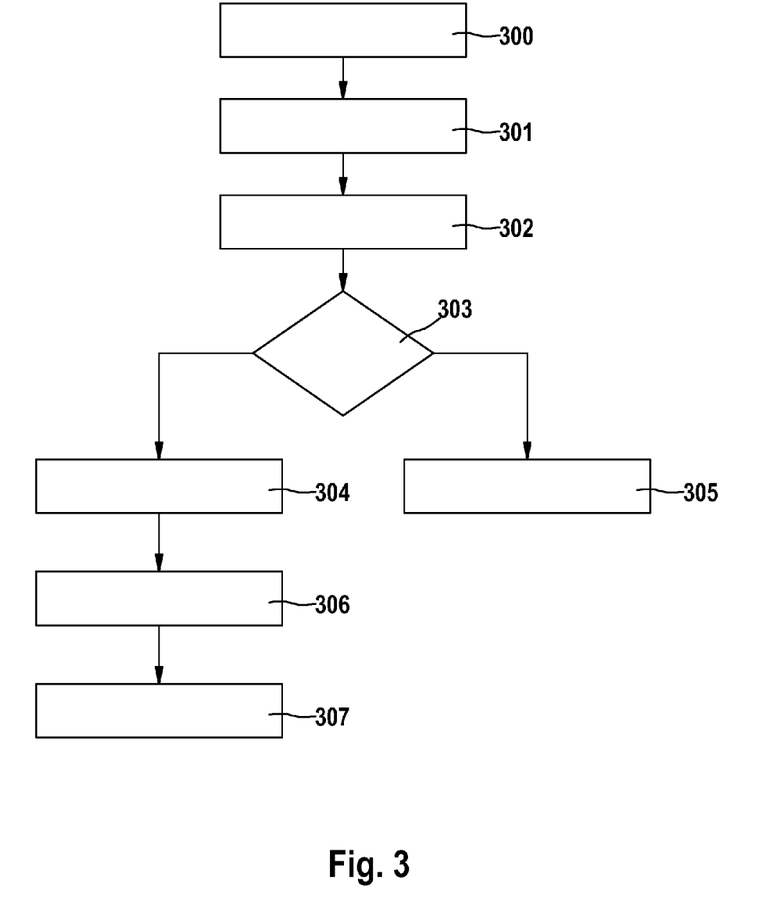
FIG. 3 depicts the method according to the disclosure for operating a brake booster in a flow diagram.

In a first step 300 it is established whether there is a change in braking effect of the regenerative partial brake system. The adaptation device adapts the pressure in the hydraulic brake system to the braking effect of the regenerative partial brake system. If this is the case, using the sensor device 20 in a step 301 the displacement travel of the input element is determined. In a step 302 using a stored curve the force to be set F_ped,soll is then determined. In a branch in step 303 it is established whether or not the idle travel 10 is overcome. If not, the brake booster in step 305 is operated as normal on the basis of its original curve, i.e. on the basis of its original correlation between displacement travel of the input element and supporting force to be applied. The feedback effect F_ped in this case results solely from the first spring 5 via the return force F_spring1. The driver knows this behavior, no setting of the force F_ped is required and hence no change in supporting force F_sup.

If however in step 303 it is found that the idle travel is overcome, the method continues in step 304. In step 304 the parameters necessary to establish the momentary forces are determined. To this end information which directly or indirectly represents the forces currently present can be supplied to a control unit which processes this information further and uses it to control the brake booster. The information is supplied by sensors which are present in the brake system or in individual components of the brake system, or is derived from known operating parameters of individual components.

Thus the return force of the first spring F_spring1 11 and the return force of the second spring F_spring2 15 can be determined from the respective pretension of the springs, the respective spring constants and the spring travel present i.e. the compression of the springs. In the case of a linear spring curve, for example the return force F_spring1 11 of the first spring is $F\_spring1 = F0 + k*s,$ wherein here F0 is the pretension and s the displacement travel of the input element. The pretension and spring constant can be stored as software in the control unit, the displacement travel of the input element can be determined by means of the sensor device 20.

To determine the return force of the second spring F_spring2 15, the spring travel can be calculated for example via a rotary position sensor (not shown) of motor 23 using the gear ratio.

In the case of non-linear spring curves, for both springs the return force can be determined from the respective spring curve for a known spring travel. The non-linear spring curve can be stored as software in the control unit, the spring travel arises as described above from operating data of the motor or from signals from the sensor device 20.

The supporting force F_sup can be determined using the motor control software of the electric motor 23. Via the motor controller, the moment currently present can be calculated from the motor power. The resulting supporting force arises from the efficiency and the gear ratio.

The reaction force F_hyd can be determined in two ways. One possibility is to measure the pressure in the hydraulic assembly, for example the pre-pressure, by means of a sensor in the ESP hydraulic assembly. Using this measured pressure, taking into account the cross-sectional area of the master cylinder, the reaction force F_hyd can be determined. A further possibility is to use the volume increase in the adaptation unit 19 with a known pressure-volume curve of the hydraulic brake system to determine the pressure in the hydraulic brake system and then from this determine the reaction force F_hyd as described for the first possibility.

For all methods or ways described here it must be stated that these in no case constitute the only possibilities of determining the forces involved. Thus it is readily conceivable to determine the forces also directly via force sensors or for example to provide further distance and/or pressure sensors by means of which the forces can then be determined.

If the values for F_spring1, F_spring2, F_sup and F_hyd are known, the feedback effect F_ped present momentarily is determined therefrom.

From the difference between the nominal value F_ped,soll and the present feedback effect F_ped, in step 306 the supporting force to be adjusted is determined. This supporting force is then adjusted in step 307.

In this way it is guaranteed that the driver experiences the feedback effect at the input element which he expects at this actuating position irrespective of whether braking takes place purely hydraulically, purely regeneratively or with a mixture of the partial brake systems.

If for example braking is purely regenerative, the adaptation device ensures that the reaction force F_hyd is equal to zero. The feedback effect F_ped is then: F_ped=F_spring1+F_spring2−F_sup.

Here we see that by adjusting the supporting force, any feedback effect can be set between zero and a maximum value F_ped,max=F_spring1+F_spring2.

In this situation the brake booster then has the function of a pure pedal simulator. The feedback F_ped is based only on the return force of the first spring F_spring1 11 and the return force of the second spring F_spring2 and on the supporting force.

The function of the brake booster in situations in which F_hyd=0, or F_hyd is constant, can be used for example also with other types of external force braking, for example with brake circuits decoupled from the master brake cylinder, wherein then pressure is built up in the hydraulic assembly. In these situations too by adjusting the supporting force the pedal feedback effect can be set as described between zero and a maximum value F_ped,max=F_spring1+F_spring2. Where applicable a constant force F_hyd is to be taken into account.

The invention claimed is:

1. A method for operating a controllable brake booster of a brake system of a motor vehicle, comprising:
    using an input element of the controllable brake booster to activate the brake system,
    wherein a pedal force which acts on the input element is set by operating the controllable brake booster, and wherein a first spring element is arranged between the input element and a booster body of the controllable brake booster, and further wherein a second spring element is arranged between an output element of the controllable brake booster and a master cylinder,
    wherein the pedal force depends on an effect of the first and/or second spring element and is set by the brake booster using at least one piece of information in relation to the first and/or second effect.

2. The method as claimed in claim 1, wherein an idle travel dependent on an operating mode of the brake booster is provided between the input element and the output element, further comprising:
    when an idle travel is present, operating the controllable brake booster to apply a supporting force correlating to a displacement travel of the input element.

3. The method as claimed in claim 2, wherein the pedal force is dependent on the effect of the first spring element.

4. The method as claimed in claim 3, wherein the pedal force is dependent on the effect of the first spring element via a spring force according to the correlation: the pedal force=the spring force.

5. The method as claimed in claim 1, wherein an idle travel dependent on the operating mode of the brake booster is provided between the input element and the output element, and wherein the brake booster is configured to apply a supporting force acting on the output element, further comprising:
    when the idle travel is overcome, operating the controllable brake booster such that the pedal force is set by adjusting the supporting force.

6. The method as claimed in claim 5, wherein the supporting force is set by operating the brake booster such that the pedal force acting on the input element assumes a pre-specified value.

7. The method as claimed in claim 6, wherein the pre-specified value for the pedal force depends on a displacement travel of the input element.

8. The method as claimed in claim 6, wherein the pre-specified value for the pedal force depends on the effect of the first spring element, the effect of the second spring element called the second spring force, and on he supporting force according to the correlation: the pedal force=a first spring force+the second spring force+an additional force—the supporting force, and is set using at least one piece of information relating to these values.

9. The method as claimed in claim 8, wherein:
    when the only braking effect is applied by an additional brake system, adjusting the supporting force each pedal force is less than or equal to a limit value of the pedal force on the input element, and
    the limit value of the pedal force on the input element arises according to the following formula: the limit value of the pedal force on the input element=the first spring force+the second spring force.

10. The method as claimed in claim 6, wherein the pre-specified value for the pedal force depends on a displacement travel of the input element in the form of a curve.

11. The method as claimed in claim 1, wherein (i) the controllable brake booster is part of a hydraulic partial brake system of a total brake system, (ii) the total brake system as well as the hydraulic partial brake system has an additional partial brake system, and (iii) the brake booster is configured to apply a supporting force that acts on the output element, further comprising:
    countering a change in the pedal force by adjusting the supporting force, and
    initiating the change in the pedal force by adapting a braking effect of the hydraulic partial brake system to a change in braking effect of the additional partial brake system.

12. The method as claimed in claim 11, wherein the braking effect is adapted such that a total braking effect of the hydraulic partial brake system and the additional partial brake system is held constant.

13. The method as claimed in claim 11, wherein the braking effect of the hydraulic partial brake system is adapted by setting the braking effect independently of the driver's force by an adaptation device.

14. A device for controlling a controllable brake booster which is part of a brake system of a motor vehicle, comprising:
- an input element configured to activate the brake system, wherein the controllable brake booster is configured to apply a supporting force that acts on an output element of the brake booster, and wherein the control takes place such that by the brake booster a pedal force is set which acts on the input element,
- a first spring element arranged between the input element and a booster body of the controllable brake booster, and
- a second spring element arranged between the output element of the controllable brake booster and a master cylinder,
- wherein the control by the brake booster takes place such that the pedal force depends on an effect of the first and/or second spring element.

15. The device as claimed in claim 14, wherein:
- an idle travel dependent on an operating mode of the brake booster is provided between the input element and the output element, and
- the control takes place such that when the idle travel is overcome, the controllable brake booster applies the supporting force by which the pedal force is set.

16. The device as claimed in claim 15, wherein:
- the controllable brake booster is part of a hydraulic partial brake system of a total brake system which as well as the hydraulic partial brake system has an additional partial brake system,
- the control takes place such that the brake booster applies the supporting force which counters a change in the pedal force, and
- the change in the pedal force is initiated by adapting a braking effect of the hydraulic partial brake system to a change in a braking effect of the additional partial brake system.

* * * * *

UNITED STATES PATENT AND TRADEMARK OFFICE
CERTIFICATE OF CORRECTION

Page 1 of 1

PATENT NO.        : 8,899,696 B2
APPLICATION NO.   : 13/579171
DATED             : December 2, 2014
INVENTOR(S)       : Weiberle et al.

It is certified that error appears in the above-identified patent and that said Letters Patent is hereby corrected as shown below:

In the Claims

In claim 8, column 10, line 34, delete the text "he" located between the words "on" and "supporting" and insert --the-- in its place.

In claim 9, column 10, line 41, insert --such that-- between the words "force" and "each".

Signed and Sealed this
Fourth Day of August, 2015

Michelle K. Lee
*Director of the United States Patent and Trademark Office*